(12) United States Patent
Kerns

(10) Patent No.: US 7,815,015 B2
(45) Date of Patent: Oct. 19, 2010

(54) TOWABLE ELEVATABLE STAND

(76) Inventor: James P. Kerns, 1448 Kinsman Rd., NW., North Bloomfield, OH (US) 44450

( * ) Notice: Subject to any disclaimer, the term of this patent is extended or adjusted under 35 U.S.C. 154(b) by 900 days.

(21) Appl. No.: 11/534,212

(22) Filed: Sep. 21, 2006

(65) Prior Publication Data

US 2007/0074933 A1 Apr. 5, 2007

Related U.S. Application Data

(60) Provisional application No. 60/719,034, filed on Sep. 21, 2005.

(51) Int. Cl.
*E06C 1/397* (2006.01)
(52) U.S. Cl. ............... 182/127; 296/26.05; 182/63.1
(58) Field of Classification Search ............... 182/127, 182/63.1; 296/26.05
See application file for complete search history.

(56) References Cited

U.S. PATENT DOCUMENTS

| | | | |
|---|---|---|---|
| 5,295,555 A | | 3/1994 | Strange |
| 5,505,515 A | * | 4/1996 | Turner ............... 296/173 |
| 5,862,827 A | * | 1/1999 | Howze ............... 135/88.01 |
| 5,951,096 A | * | 9/1999 | Steury et al. ......... 296/171 |
| 6,196,604 B1 | * | 3/2001 | Hoh et al. ............ 296/26.05 |
| 6,290,023 B1 | | 9/2001 | Martin |
| 6,349,793 B1 | * | 2/2002 | Kincaid ............... 182/69.4 |
| 6,443,516 B2 | * | 9/2002 | Lambright ........... 296/26.05 |
| 6,447,038 B1 | * | 9/2002 | Davis et al. .......... 296/26.05 |
| 6,460,653 B1 | | 10/2002 | Hardy et al. |
| 6,523,641 B2 | * | 2/2003 | Smith ................. 182/63.1 |
| 6,637,549 B1 | * | 10/2003 | Lopacki .............. 182/127 |
| 7,194,842 B2 | * | 3/2007 | Baird ................. 52/125.2 |
| 2005/0194807 A1 | * | 9/2005 | Gonzalez ............. 296/26.05 |

\* cited by examiner

*Primary Examiner*—Katherine W Mitchell
*Assistant Examiner*—Daniel Cahn
(74) *Attorney, Agent, or Firm*—D. A. Stauffer, Reg. Pat. Agent

(57) ABSTRACT

A towable elevatable stand includes a platform that is always elevated above a trailer bed to at least a minimum elevation, but can be easily raised to selected elevations up to almost double the minimum elevation. This allows for carrying ATV, supplies, etc. on the trailer bed under the platform. Telescoping corner posts with latch pins for securing the platform at selected elevations can be combined with a simple winch, pulleys and cables for raising/lowering the platform. Commercially available parts, light weight materials, and a simple elevating apparatus produce a light weight, cost effective stand that is easy to use, tow and maintain, and which minimizes wind resistance. The platform is perforated for drainage and light weight, and the blind is a pop-up tent that is stowed for towing.

8 Claims, 5 Drawing Sheets

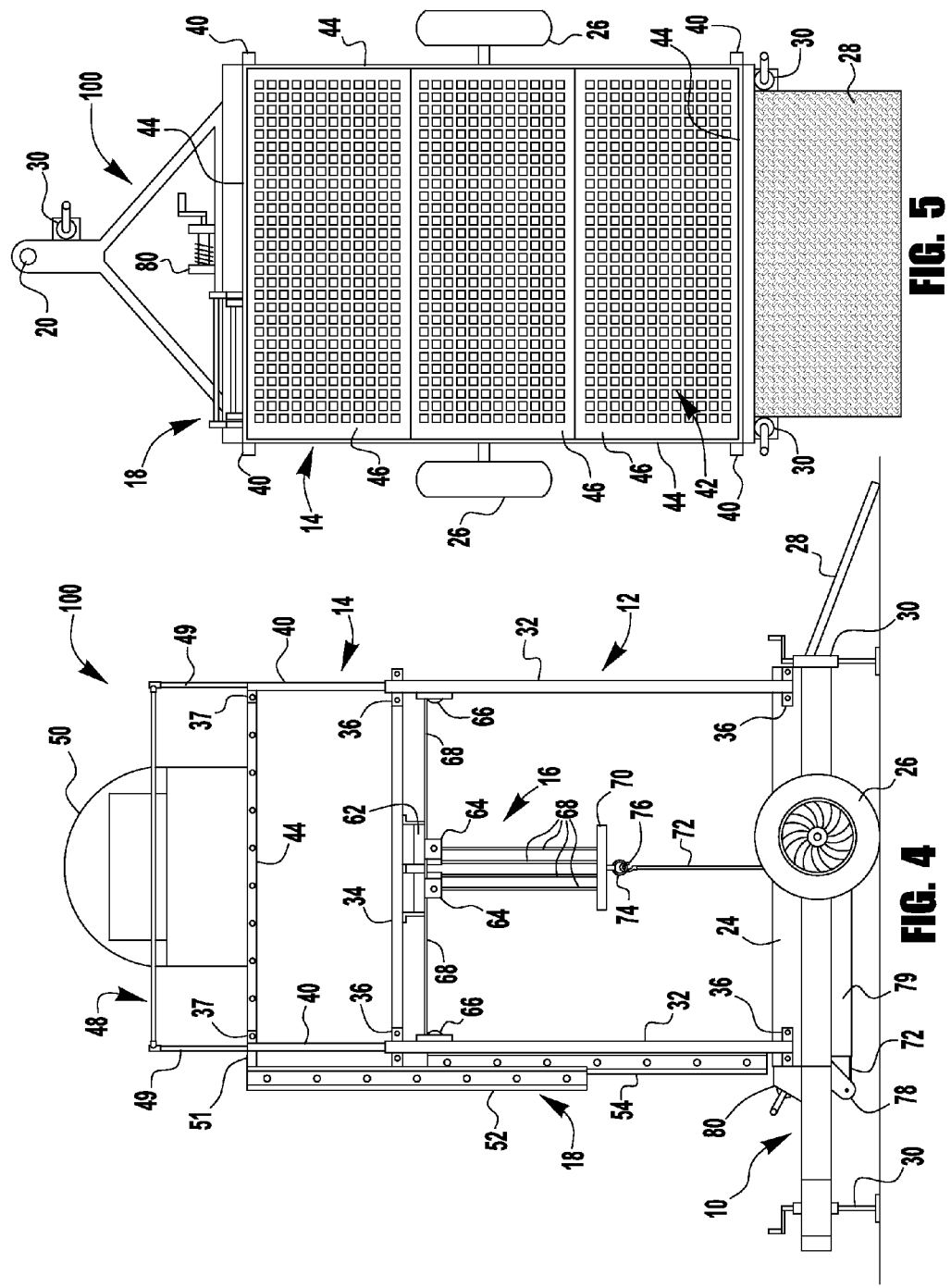

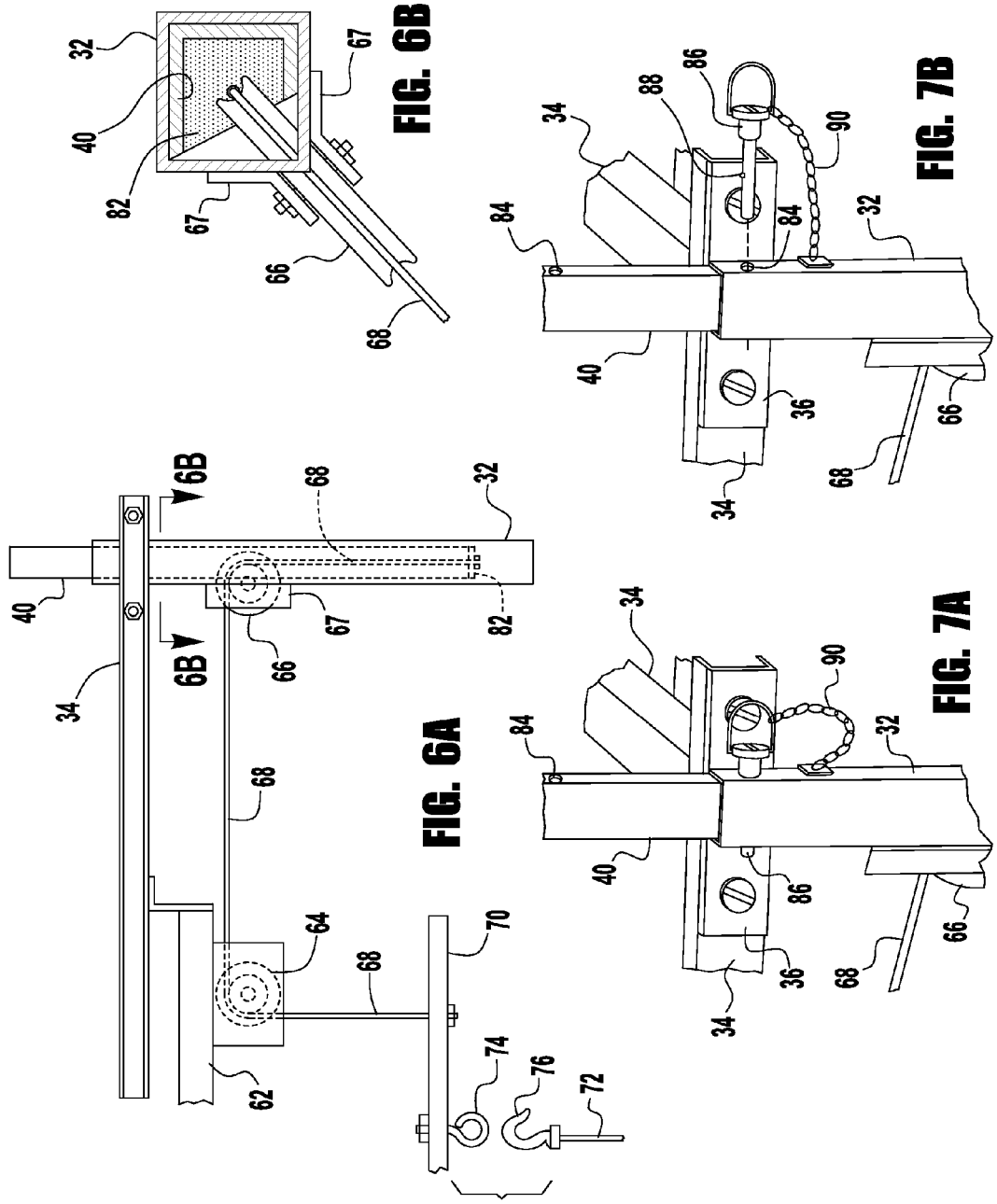

TOWABLE ELEVATABLE STAND

CROSS-REFERENCE TO RELATED APPLICATIONS

This application claims the benefit of U.S. Provisional Patent Application No. 60/719,034 filed Sep. 21, 2005 by James P. Kerns.

TECHNICAL FIELD OF THE INVENTION

The present invention relates to elevated platforms and, more particularly to a variable height elevated stand mounted on a towable trailer.

BACKGROUND OF THE INVENTION

Hunting blinds are well known and come in a wide variety of forms, all designed to hide a hunter from view of the animal being hunted. Particularly when hunting deer and the like, there is also an advantage to being elevated in a stand, possibly enclosed as a blind. For instance, the hunter can simply climb a tree and sit on a branch, or can build a kind of "tree house" in the tree. Commercially available blinds/stands include ones that make this easier by supplying a ladder with a platform at the top which can be strapped onto a tree trunk. However, in areas like field and meadow edges, right of ways, and the like, where suitable large trees may not be available, a self contained elevated hunting stand is desirable. Such a stand preferably allows for erection of a blind on the platform, or else integrates the blind with the platform. Of course elevated stands are also useful for activities other than hunting, for example as observational stands for military, forestry, wildlife observation, filming, sporting events, etc. Therefore the elevated stand is preferably movable to different locations. Since self contained movable stands tend to be bigger and more difficult to transport, some elevated stands are transportable on a trailer, preferably one that can be towed by a vehicle including off the road vehicles such as an All Terrain Vehicle (ATV). It is further desirable to use the same trailer to simultaneously transport the stand with or without a blind and the ATV on any road including high speed highways. Thus room for everything must be provided, and also the stand/blind must be lowered to a height acceptable for use on typical highways (e.g., fitting under low bridges) and must also minimize wind resistance when lowered for high speed highway traveling.

A few solutions to this combination of requirements are revealed in the prior art, but as will be seen, all have significant limitations, especially in terms of being rather expensive and/or inconveniently heavy and wind resistant because of their complicated and massive structure that is needed to raise and lower the blind/stand platform. Furthermore, the means of elevation and/or assembly is complex and requires many steps to operate, as well as a battery powered electric motor in some cases.

U.S. Pat. No. 5,295,555 (Strange; 1994) discloses a Hydraulic Deer Stand that provides an elevated hunting stand (i.e., a platform with walls) that is mounted on a trailer which can be pulled by an ATV or can transport the ATV. The stand is elevated by hydraulics operating on an articulated support structure, the hydraulics being operated by an electric hydraulic pump (80). The blind enclosure (receptacle 50 with walls 62, 64) remains assembled when lowered for traveling.

U.S. Pat. No. 6,290,023 (Martin; 2001) discloses a Sports Utility Trailer that provides an elevated stand (platform with tent-like fabric walls on bowed supports) that is mounted on a trailer which can be pulled by an ATV or can transport the ATV. The stand is elevated by an ATV pulling it up over levered support struts and the trailer base is pulled upward to form one of the support struts plus a ladder. In the lowered position, the tent-like stand is disassembled for transportation.

U.S. Pat. No. 6,460,653 (Hardy et al.; 2002) discloses a Combined Trailer And Hunting Stand Operable Between Elevated And Collapsed Positions. The stand is a box enclosure with hard walls that are hinged for collapsing for storage during transport on a on a trailer which can be pulled by an ATV or can transport the ATV. The stand is elevated by an electric winch operating on a scissor action support structure. In its lowered position, the stand walls are folded together and laid flat for storage under trailer bed hinged floor plates.

U.S. Pat. No. 6,523,641 (Smith; 2003) discloses a Trailer Mounted, Retractable Elevated Hunting Stand (a platform surrounded by a fence rail) that is mounted on a trailer which can be pulled by an ATV or can transport the ATV. The stand is jackknifed up and down by hand, assisted by a spring bias. Extra support struts must be assembled. Added height is attained with telescoping supports operated by a hand-cranked screw mechanism (FIG. 7). The platform must be lowered in order to load an ATV onto the trailer.

Thus it is an object of the present invention to overcome the limitations inherent in the prior art, including weight, complexity, cost, and ease of use; while also providing a stand that can be elevated and towed behind a vehicle. It is a further object to provide the ability to transport on high speed roadways added equipment such as an ATV on the towable stand.

BRIEF SUMMARY OF THE INVENTION

According to the invention a towable elevatable stand comprises: an elevatable platform mounted above a towable trailer at a permanent minimum height leaving room for storing and towing items on the trailer below the platform; wherein the platform is supported by four vertically telescoping corner posts, each of which comprises: a hollow tubular fixed post, open at the top, attached to the trailer at the bottom, and extending to a first height that determines the platform's minimum elevation; a telescoping post, attached at the top to the platform and telescopingly engaged with the fixed post by extending down into the fixed post through its open top, for telescopically extending to raise the platform to one or more temporary second heights, higher than the first height; and a latch configured to temporarily latch the platform in place at each of the one or more second heights.

According to the invention the towable elevatable stand further comprises: an elevating apparatus comprising a winch with a cable that can be winched in or let out; pulleys positioned to guide the cable from the winch to an upper portion of a fixed post; a post pulley that is bracketed to, and that passes through, a wall of the fixed post such that the cable passes around the pulley and down into the fixed post; a vertical slot, at least wide enough to accommodate a width of the post pulley, the slot cutting through a side of the telescoping post and extending down along the side of the telescoping post, and the slot being oriented such that when the telescoping post is telescopingly engaged with the fixed post the post pulley passes through both the fixed post and the telescoping post while the telescoping post moves up and down for raising and lowering the platform; and an attachment of the cable to the inside of the telescoping post.

Preferably the cable further comprises: a winch cable portion that extends from the winch; and four post cable portions that are commonly connected to the winch cable and extending from the winch cable to the four corner posts, each one of the four post cables extending to a post pulley on a unique one of the four corner posts. Further preferably, the cable further comprises a detachable connection between the winch cable and the four post cables.

According to an embodiment of the invention, the winch is mounted on the trailer; the winch cable is directed by pulleys to extend upward from the trailer floor; the winch cable-to-post cables connection is located at an elevation near the top of the corner posts when the platform is lowered to its minimum elevation; and four top pulleys are suspended above the four post cables such that each one of the post cables can pass up over a unique one of the top pulleys to extend therefrom to one of the corner posts.

According to an embodiment of the invention the latch comprises: a first latch hole passing through a first one of the telescopically engaged posts of a corner post; one or more second latch holes passing through the second one of the telescopically engaged posts of the corner post, wherein the second latch holes are spaced apart up the length of the second post, each second latch hole being oriented to align with the first latch hole when the platform is raised to a selected temporary second height; and a removable latch pin sized for passing through aligned first and second latch holes.

According to the invention the towable elevatable stand further comprises: an extension ladder wherein a fixed part of the ladder is attached to the trailer; and a slidably engaged extending part of the ladder is attached to the platform.

According to the invention the towable elevatable stand further comprises a separate tent or blind for placing on top of the platform.

According to the invention the towable elevatable stand further comprises a separate safety railing for placing on top of the platform.

According to the invention the towable elevatable stand further comprises: a ramp for the trailer; and stabilizing jack stands attached to the trailer.

According to the invention the platform comprises a lightweight, perforated deck.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1:
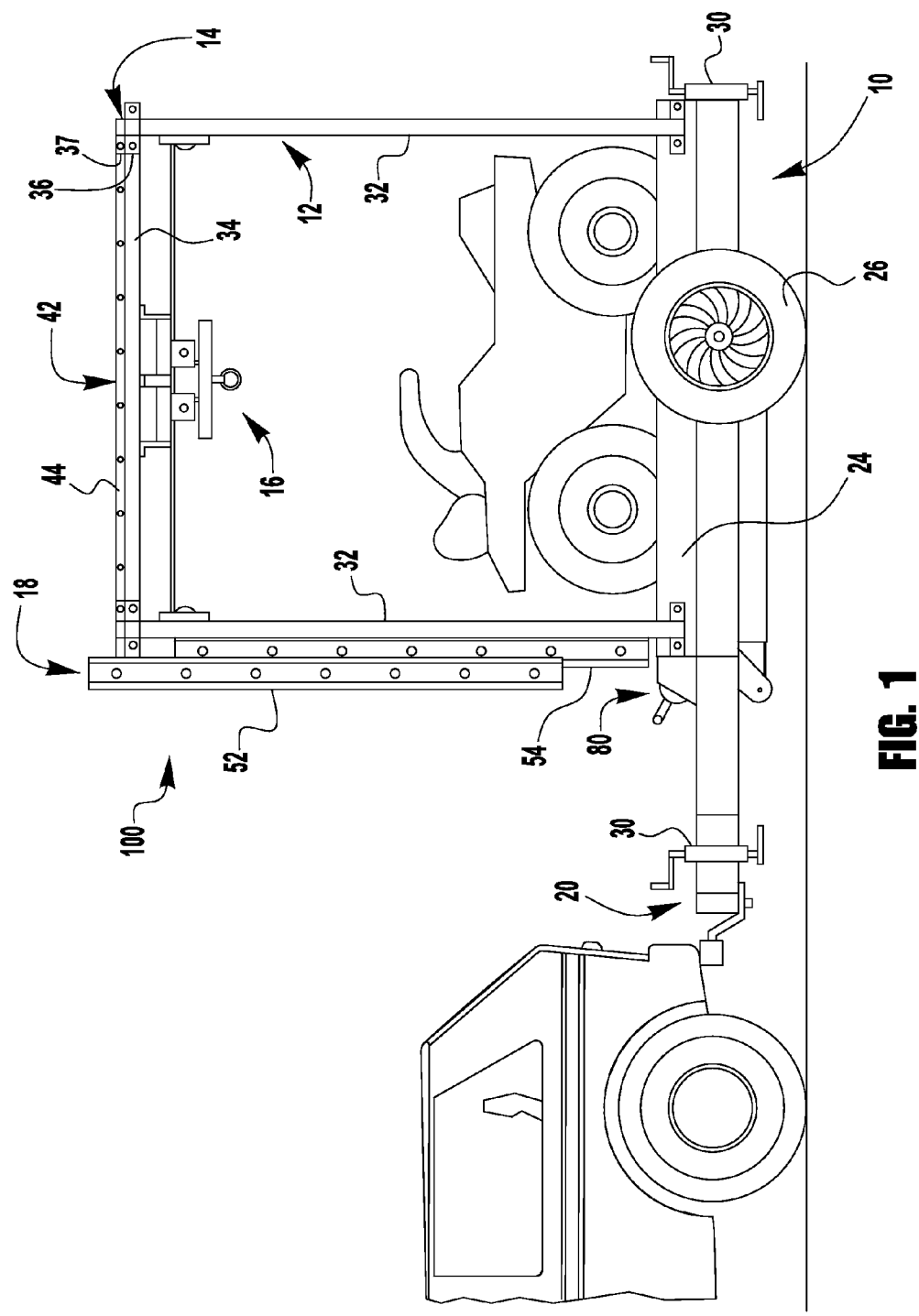
Figure 2:
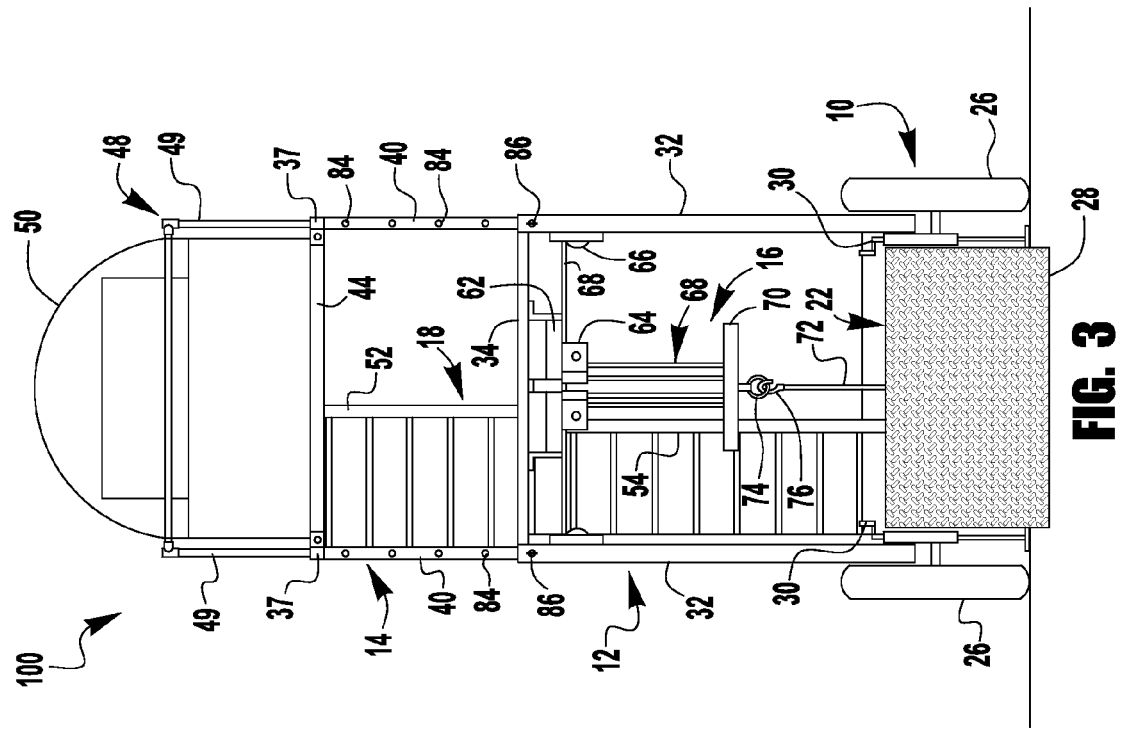
Figure 3:
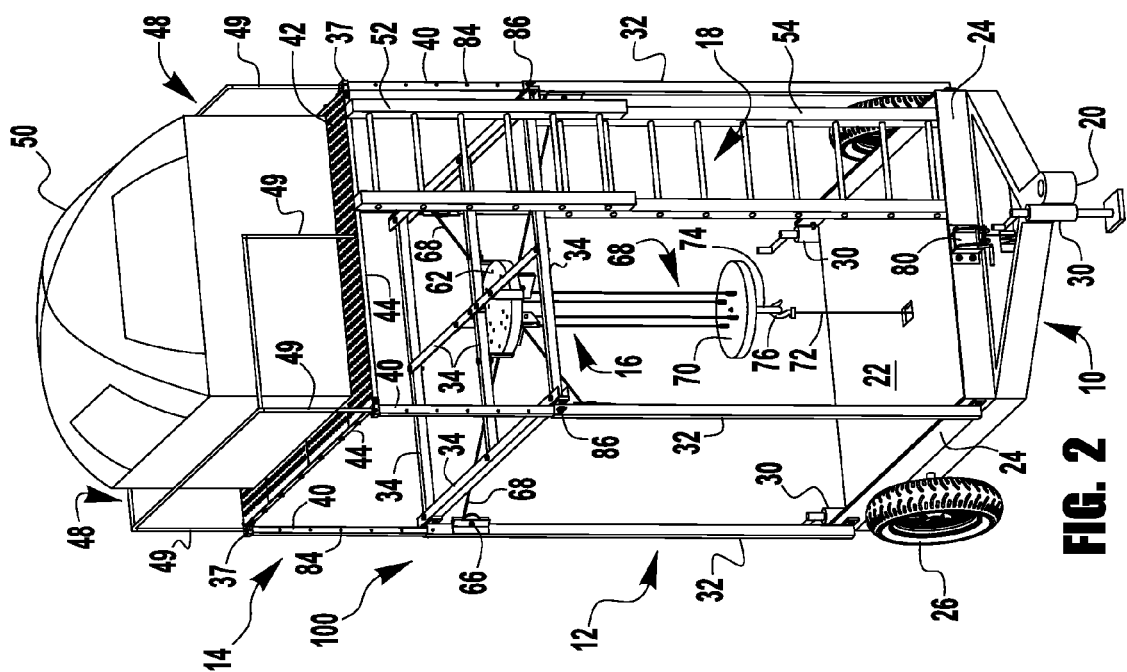
Figure 8:
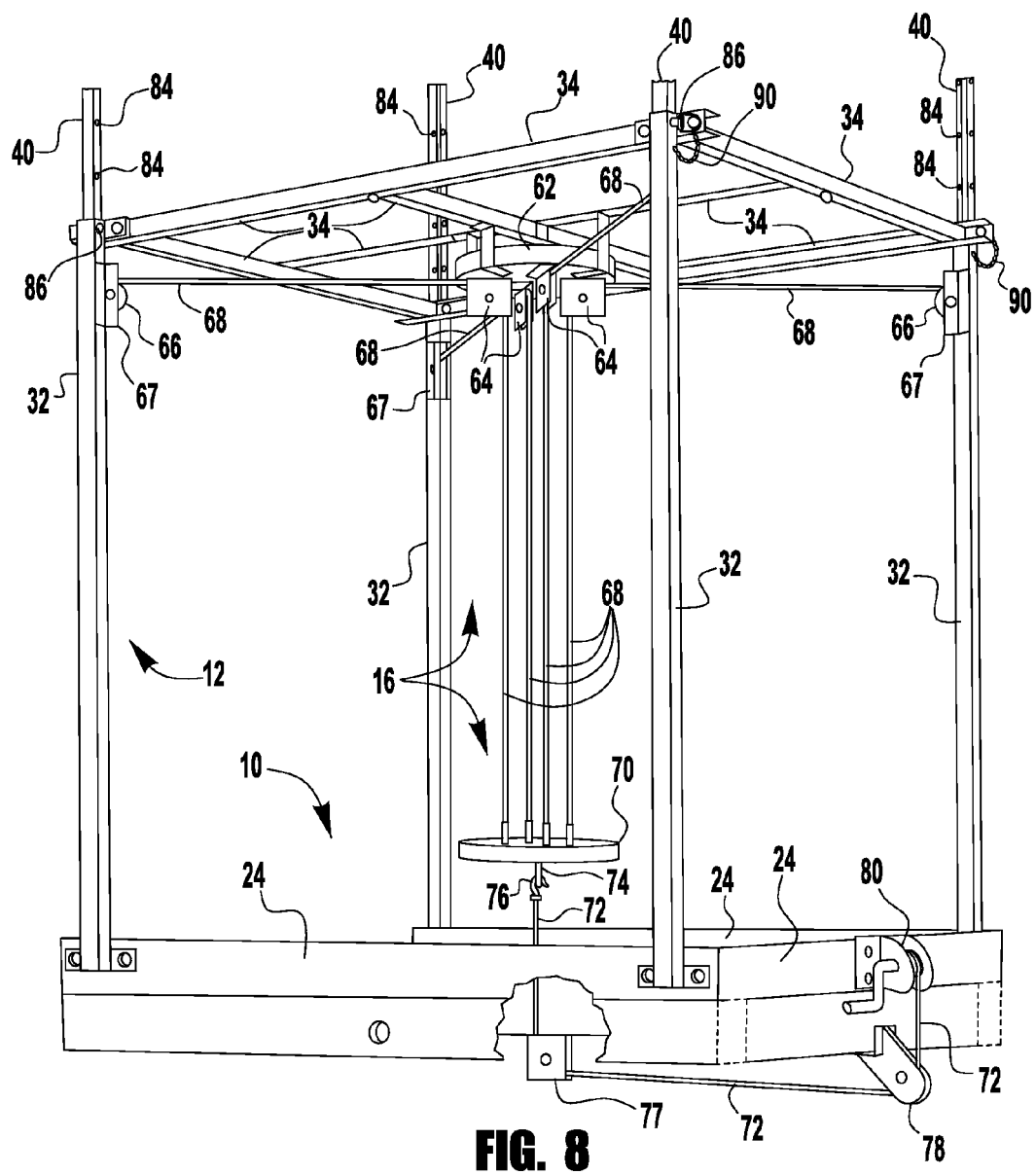

The structure, operation, and advantages of the present preferred embodiment of the invention will become further apparent upon consideration of the following description taken in conjunction with the accompanying drawings, wherein:

FIG. 1 is a side view of a towable elevatable stand in a traveling state being hitched to a vehicle for towing and a platform of the stand lowered to a minimum elevation, all according to the invention;

FIG. 2 is a top perspective view of the stand of FIG. 1 when it is in use as a stand for an elevated blind wherein the platform is elevated above the minimum elevation, according to the invention;

FIG. 3 is a back view of the stand in use as in FIG. 2, according to the invention;

FIG. 4 is a side view of the stand in use as in FIG. 2, according to the invention;

FIG. 5 is a top view of the stand of FIGS. 1 and 2 but with the blind and railing removed for a clear view of the platform, according to the invention;

FIG. 6A is a side view of a portion of an elevating apparatus that is shown operating in a portion of the stand of FIG. 2, according to the invention;

FIG. 6B is a cross-sectional view of a telescoping post portion of the stand of FIG. 2, the view taken as indicated by the 6B-6B line in FIG. 6A, according to the invention;

FIGS. 7A and 7B are a perspective view of a latching portion of the stand of FIG. 2, showing it latched and unlatched respectively, according to the invention; and FIG. 8 is a bottom perspective view of a portion of the stand of FIG. 2 but with tires, tow bar, and platform removed and a portion cutout, all to more clearly show the elevating apparatus, according to the invention.

DETAILED DESCRIPTION OF THE INVENTION

The present description discloses an elevated hunting blind as a preferred embodiment of the inventive towable elevated stand, which has many possible uses not limited to hunting and not limited to uses wherein a blind is situated on top of the stand (i.e., an elevated platform). The preferred embodiment implements design goals including: low weight, simple construction for ease of use as well as ease of manufacture, use of standard commercially available or off-the-shelf components as much as possible in order to minimize cost and maintenance, minimum wind resistance when lowered for transport, and use of a trailer design that is towable on both high speed roadways as well as relatively rough off the road terrain.

Referring now to the drawings, FIG. 1 shows a side view of the inventive towable elevated stand 100, while it is being towed behind a highway-suitable vehicle such as an SUV. A distinguishing feature is that a platform 42 for the stand 100 is permanently elevated to a minimum elevation (height) that is approximately 50% to 75% (percent) of a maximum elevated height, wherein all elevation heights are measured from a floor 22 of a trailer 10 on which the platform 42 is mounted. For example, the minimum elevation height $H_{min}$ is 6 feet and the maximum elevated height $H_{max}$ is 11 feet, and preferably the platform 42 can also be latched at several elevations between these limits. The minimum lowered height $H_{min}$ is called a "permanent" elevation because the platform 42 is always elevated to at least this height. This design allows placement of an ATV and/or a variety of equipment and supplies on the trailer 10 for transport, while at the same time minimizing the complexity of the elevatable stand/blind 100.

This in turn helps minimize cost, maintenance, and wind resistance while maximizing ease of use.

FIGS. 2-4 show the same towable elevated stand 100 while it is in use as an elevated hunting blind. The platform 42 is latched into a raised position and a tent-like blind 50 has been erected on top of the platform 42. Also an optional safety railing 48 has been erected on top. Both the blind 50 and railing 48 are temporary structures that can be easily collapsed, removed and stored when the stand 100 is to be moved. Lowering the platform 42 and removing anything on top of it (e.g., 48, 50) minimizes the overall height of the towable stand 100 such that clearance for roadway bridges, tunnels, and the like should not be a problem. Likewise large trees with branches that overhang roads and rights of way should also clear the lowered platform 42. Obviously the inventive stand 100 is not designed for use in dense woods. Also, by removing the blind 50 and any other objects from the platform, collapsing and storing them reduces wind resistance when the stand 100 is being towed.

By comparing FIGS. 1 and 4, it can be seen that a ladder 18 is provided that extends upwards along with the platform 42 as it is raised. In this embodiment, such a ladder is provided by attaching a fixed part 54 of an aluminum extension ladder 18 to the trailer 10 and attaching a slidably engaged extending part 52 of the ladder 18 to a platform frame 44 that surrounds and provides support for the platform 42. For example, a bracket 51 can be used for the platform frame 44 connection.

FIG. 5 is a top view of the stand 100 without the blind 50 or railing 48 on its platform 42, thereby allowing a better view of the platform 42 construction. Referring now to FIGS. 1-5, the inventive towable elevatable stand 100 comprises the trailer 10 with a lower frame 12 and an upper frame 14 mounted on it. Preferably there is an elevating apparatus 16 for assisting the user in elevating the upper frame 14 which supports the platform 42. The ladder 18 provides easy access to the top of the stand 100 where, upon the platform 42 various accessories can be temporarily placed as desired by the user and as appropriate for the stand's use. In the preferred embodiment, the accessories include, for example, the hunting blind 50 and optionally the safety railing 48. Likewise, chair(s) or bench(s), hunting supplies, food, etc. (not shown) may also be temporarily placed on the platform 42 as desired. The blind 50 should be easy and quick to erect and take down, such as a pop-up tent-like blind with shooting windows that is readily available from hunting suppliers. The safety railing 48 can be as simple as aluminum tubing with slip-fit couplings at the corners. Railing posts 49 can be shaped for temporary insertion into holes in the platform 42 or, as shown, can be coupled to the top of posts 40.

The trailer 10 is preferably a commercially available standard lightweight trailer, e.g., a simple 5'×7' two wheel trailer made of aluminum wherever possible to minimize weight. The trailer has a standard hitch 20 for towing, two wheels 26, a bed or floor 22 (e.g., expanded metal), sides 24 except at the rear where a ramp 28 is provided. For example, the ramp 28 can be lightweight expanded metal and can be hinged like a tailgate, can hook on and slide under the floor 22, or can be in two pieces that can be stowed along the sides 24. Preferably the trailer 10 has good ground clearance and Torqueflex™ suspension, and it must be suitable for both highway and off the road use. Jack stands 30, if not original equipment, are added, for example, on the tow bar and two rear corners as shown. For extra stability, jack stands 30 could also be attached at the two front corners of the trailer 10. Although shown as a hand cranked vertically extending jack, the jack stands 30 can take other forms that may provide even more stability to the stand 100. For example, the jack stands 30 could be outrigger style stabilizer legs that slide or swing out from the trailer 10.

The lower frame 12 extends upward from the trailer 10. Four fixed posts 32 are affixed by brackets 36 screwed to the trailer sides 24 at the bottom and to a top structure 34 at the top. The fixed posts 32 are, for example, 2"×2" by 6 foot long square aluminum tubing with an eighth inch thick wall. Also referring to FIG. 8, the top structure 34 is a rectangular box frame with extra cross bars for supporting the elevating apparatus 16 in the middle. The top structure 34 is constructed, for example, by bolting together lengths of aluminum C channel, square tubing, and/or aluminum strapping. The brackets 36 are welded to the fixed posts 32.

The upper frame 14 telescopes upward from the lower frame 12. There are four telescoping posts 40, each one being telescopingly engaged with (slidably engaged within) a fixed post 32 by extending down into the fixed post 32 through its open top. The telescoping posts 40 are affixed near their top ends by a bracket 37 to a platform frame 44, which in turn is supportingly attached to the platform 42. For example, the platform frame 44 is a rectangular box construction of aluminum angle stock arranged with one angled side extending inward and with the other angled side extending upward. The platform 42 can then be laid down into the platform frame 44 and secured thereto, e.g., with screws. The platform 42 is lightweight and allows precipitation to drain through it. For example, the platform 42 comprises three deck panels 46 which are 2'×4' (feet) by one inch thick perforated plastic decking commercially available from agricultural suppliers. Extra cross bars can be attached to extend the support of the platform frame 44 under the two middle seams between panels. As will be seen below, the telescoping posts 40 cannot be four-sided tubing, so they are, for example, three sided one eighth inch aluminum C channel with two adjacent sides having a 1.625" outside dimension and the remaining side having a shortened 1.125" outside dimension. Since the fixed post 32 has an inside dimension of 1.750", there is an eighth inch clearance for the telescoping post 40 to slide within the fixed post 32. Plastic glide bushings can be incorporated to further ease telescoping action.

With reference to FIGS. 3, 6A and 6B, the platform 42 can be latched for securing it at selected elevations. In the preferred embodiment a latch pin 86 can be passed through aligned latch holes 84, one of which passes through each fixed post 32 near its top, and one or more of which pass through each telescoping post 40 at positions that are spaced apart along its length. Preferably the latch pin has a spring biased detent 88. Optionally a chain 90 can be provided to loosely attach the latch pin 86 to the fixed post 32. Thus to secure the platform 42 at a selected height (elevation), the latch pins 86 are removed (see FIG. 7B); the platform 42 is raised or lowered to a desired height selected from among the heights which correspond to those that cause alignment between the latch hole 84 in the fixed post 32 and one of the latch holes 84 in the telescoping post 40; and the latch pins 86 are inserted through the aligned latch holes 84 (FIG. 7A).

Although it would be possible to use the inventive stand 100 by manually elevating the platform 42 (pushing it up by hand), it is obvious that an elevating apparatus 16 greatly eases the task and is therefore part of the illustrated preferred embodiment. In keeping with the design principles discussed hereinabove, a very simple elevating apparatus 16 is provided that involves a simple hand cranked winch 80 operating on cables 68, 72 that pass through pulleys 64, 66. Variations on this theme, for example different cable routing, winch type and placement etc., will be apparent and should be considered within the scope of the invention as long as the variant elevating apparatus 16 is simple, inexpensive, lightweight, easy to use, and easy to maintain.

With particular reference to FIGS. 2, 6A, 6B and 8, the preferred elevating apparatus 16 comprises a winch 80 pulling on a winch cable 72. The winch 80 is a commercially available lightweight hand cranked type. Less preferred because of its greater weight and complexity, a deluxe version could be a battery powered electric winch with an electric motor. The cables 68, 72 are, for example, a ³⁄₁₆" (three sixteenth inch) diameter, 302 Stainless Steel, flexible cable such as product #3458T19 from McMaster-Carr (Aurora, Ohio). The winch 80 is mounted on the front side 24 of the trailer 10, and the winch cable 72 passes from it below the trailer 10, around two pulleys 78, 77 and up through the trailer floor 22 to a hook 76 affixed at the end of the winch cable 72. In FIG. 4 an optional cable cover 79 can be seen protecting the winch cable 72 as it passes underneath the trailer 10.

The winch cable 72 is hooked into an eye 74 protruding below a hub plate 70 to form an easily detachable connection. As illustrated in FIG. 1, this hook 76 and eye 74 type of detachable connection allows the user to leave the hub plate 70 up high and to winch the winch cable 72 down until the hook 76 is on the floor 22 (preferably in a recess, not shown) such that both the winch cable 72 and the hub plate 70 are out of the way to allow loading the trailer 10 with, for example, an ATV as shown.

Attached to the top of the hub plate 70, four post cables 68 extend upward, each one then turning around a top pulley 64 to extend outward to a post pulley 66 that is attached by a corner bracket 67 to a fixed post 32. As illustrated in FIGS. 6A and 6B, the post pulley 66 is mounted such that it passes through a slot in the inside corner of the fixed post 32, thereby directing the post cable 68 over its top and down inside the fixed post 32. The specially shaped C channel telescoping post 40 is oriented such that the open side of the C channel faces the post pulley 66 and further such that the shortened leg of the C channel extends along one of the fixed post 32 sides that forms the corner through which the post pulley 66 passes. This allows the telescoping post 40 to slide up and down within the fixed post 32 without touching the post pulley 66, and more importantly, this allows the post cable 68 to pass through the open side of the telescoping post 40 to its center. Thus the post cable 68 extends down the length of the telescoping post 40 to be attached to an end plate 82 affixed near the bottom of the telescoping post 40. The four top pulleys 64 are attached to a pulley support 62 which in turn is attached to the top structure 34 by, for example, strap metal and screws. The top pulleys 64 and the post pulleys 66 are both, for example, a pulley having a 3.5" OD sheave with hub, a rim width of 0.44", a hub diameter of 1" and a 0.5" bore diameter such as product #9466T84 from McMaster-Carr. The bottom pulleys 77 and 78 can also use the same commercial pulley; only the pulley brackets (e.g., 67) may need to be customized for each particular pulley use.

It can be seen that winching the winch cable 72 downward when it is hooked to the hub plate 70 will pull the hub plate 70 downward, and correspondingly will simultaneously pull the four telescoping posts 40 (and the attached platform 42) upwards by means of the four post cables 68. As discussed hereinabove, when the platform 42 has been raised to a desired elevation corresponding to a selected latch hole 84, then the four latch pins 86 can be inserted to latch the platform securely at the desired elevation without depending on the strength of the cables 68, 72, the winch 80 etc. to hold up the platform 42 while it is in use as a stand 100. When the user wishes to lower the platform 42, he simply makes sure that the winch cable 72 is hooked to the hub plate 70 and winched tight; removes the four latch pins 86, and cranks the winch in the reverse direction for playing out the winch cable 72 which is pulled on by the weight of the platform 42 and upper frame 14.

The pulley cable 68 lengths are selected such that when the platform 42 is at its minimum elevation $H_{min}$, the hub plate 70 is pulled up close against the top pulleys 64. This assures that the hub plate 70 will be up out of the way when the stand 100 is prepared for loading, unloading, and traveling. Also, since the telescoping posts 40 are pulled upward the same distance as the hub plate 70 is pulled down, then given long enough telescoping posts 40, the platform 42 could be potentially raised to a maximum elevation $H_{max}$ of about double the minimum elevation $H_{min}$. However, given the placement of the top pulleys 64, the amount of telescoping post 40 that needs to be left in the fixed post 32 for strength reasons, and other such considerations that will be apparent to a designer of ordinary skill, a more practical maximum elevation $H_{max}$ would be anywhere from about 85% to about 33% higher than the minimum elevation $H_{min}$. Another way to state these numbers is to say that the minimum elevation $H_{min}$ is at best 50% of the maximum elevation $H_{max}$, but could be as much as about 75% of it.

Given the above teaching, it should be apparent that other functionally equivalent pulley systems can be devised that will, for example, direct the cables up a side or corner of the lower frame 12 instead of up through the middle of the trailer bed 22. Such alternate elevating systems 16 will still work by pulling a cable attached to the telescoping post 40 up through the inside of the telescoping corner post 32/40, and therefore are considered to be within the scope of the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A towable elevatable stand comprising:
   a trailer having at least one wheel making the trailer towable, said trailer also having a floor, and orientations are described relative to the trailer floor such that "vertical" means orthogonal to the trailer floor; and
   an elevatable platform telescopingly mounted to the trailer above the trailer floor by a platform elevating apparatus that comprises:
   four vertical corner posts; each said corner post comprising: a hollow tubular fixed post having a respective bottom end which is attached to the trailer, and a respective open top end located at a fixed height above the trailer floor; and a corresponding telescoping post extending from a respective bottom end positioned within the corresponding fixed post, to a respective top end that is attached to the platform, wherein each said telescoping post is telescopingly engaged with the corresponding fixed post by extending down into the corresponding fixed post through said respective fixed post open top end for telescopically extending upward to elevate the platform, wherein the respective fixed heights of the four fixed post top ends determine a minimum height of the platform above the trailer floor; thereby leaving room for storing and towing items on the trailer floor below the platform;

a winch mounted on the trailer;

a winch cable that extends from the winch to a winch cable end;

a pulley directing the winch cable to extend upward from the trailer floor;

a connection hub positioned above the upward extending winch cable;

a detachable connection between the winch cable end and the connection hub;

four top pulleys suspended above the connection hub, each one of the four top pulleys being associated with a respective one of the four corner posts;

wherein each respective one of the four corner posts comprises:

a respective post pulley that is bracketed to, and that passes through, a wall of the respective fixed post;

a respective vertical slot cutting through a side of the respective corresponding telescoping post and extending down along the side thereof, wherein the respective vertical slot is oriented such that the respective post pulley passes through both said wall of the respective fixed post and said side of the respective corresponding telescoping post while the respective corresponding telescoping post moves vertically while telescopingly engaged with the respective fixed post; and a respective cable attachment point inside of the respective corresponding telescoping post near said respective bottom end thereof; and the platform elevating apparatus further comprising:

four post cables that are commonly connected to the connection hub, after which each one of the four post cables:

extends upward from the connection hub, turns around a respective one of the four top pulleys, extends to a respective associated one of the four corner posts;

turns around the respective post pulley, thereby passing into the respective corresponding telescoping post, and extends downward to said respective cable attachment point where the respective post cable is attached to the respective corresponding telescoping post;

wherein each one of the four post cables has a respective length such that the connection hub is pulled up to a height near the minimum height of the platform when the platform elevating apparatus has lowered the platform to its minimum height.

2. The towable elevatable stand of claim 1, wherein the detachable connection between the winch cable end and the connection hub comprises:

corresponding hook and eye portions; wherein one of the corresponding hook and eye portions is affixed to the winch cable end; and the other one of the corresponding hook and eye portions is affixed to the connection hub.

3. The towable elevatable stand of claim 1, further comprising:

a latch configured to temporarily supportingly hold the platform in place after the platform elevating apparatus has raised the platform to a user-selected one of one or more latchable heights above the minimum platform height;

wherein the latch comprises, for at least one of the four corner posts;

a single latch hole passing through both the fixed post and the corresponding telescoping post of the at least one corner post;

one or more additional latch holes, parallel to the single latch hole, and passing through one of the fixed post and the corresponding telescoping post of the at least one corner post, wherein the one or more additional latch holes are spaced apart up the length of the at least one corner post; and a removable latch pin sized for passing through the single latch hole and the one or more additional latch holes.

4. The towable elevatable stand of claim 1, further comprising:

an extension ladder wherein a fixed part of the extension ladder is attached to the trailer; and a slidably engaged extending part of the extension ladder is attached to the platform.

5. The towable elevatable stand of claim 1, further comprising:

a separate tent or blind for placing on top of the platform.

6. The towable elevatable stand of claim 1, further comprising:

a separate safety railing for placing on top of the platform.

7. The towable elevatable stand of claim 1, further comprising:

a ramp for the trailer; and stabilizing jack stands attached to the trailer.

8. The towable elevatable stand of claim 1, wherein the platform comprises:

one or more commercially available perforated plastic decking panels.

* * * * *